United States Patent
Kundu et al.

(10) Patent No.: US 7,451,191 B2
(45) Date of Patent: Nov. 11, 2008

(54) SYSTEM AND METHOD FOR DOWNLOADING A DOCUMENT FROM A SERVER COMPUTER TO A CLIENT COMPUTER

(75) Inventors: Ashish Kundu, Orissa (IN); Amit Anil Nanavati, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 999 days.

(21) Appl. No.: 10/727,885

(22) Filed: Dec. 4, 2003

(65) Prior Publication Data

US 2005/0138135 A1 Jun. 23, 2005

(51) Int. Cl.
G06F 15/16 (2006.01)
(52) U.S. Cl. ..................... 709/217; 709/203
(58) Field of Classification Search ............. None
See application file for complete search history.

(56) References Cited

U.S. PATENT DOCUMENTS 6,161,185 A 12/2000 Guthrie et al.
6,314,451 B1 * 11/2001 Landsman et al. .......... 709/203
6,353,923 B1 3/2002 Bogle et al.
6,462,752 B1 10/2002 Ma et al.
6,466,967 B2 * 10/2002 Landsman et al. .......... 709/203
6,538,673 B1 * 3/2003 Maslov ...................... 715/853
6,993,568 B1 * 1/2006 Hauduc et al. .............. 709/217
7,159,014 B2 * 1/2007 Kausik et al. ............... 709/217
7,197,515 B2 * 3/2007 Rivers-Moore et al. ..... 707/200

* cited by examiner

Primary Examiner—John B. Walsh
(74) Attorney, Agent, or Firm—Gibb & Rahman, LLC

(57) ABSTRACT

A system and method downloads a document from a server computer to a client computer. The method and system comprises the steps of repackaging scripts in a document program at the server such that scripts are in a program location no earlier than the program location of a first corresponding data element and downloading the repackaged document program to the client. The method renders rendering the repackaged document at the client as it arrives until complete, and in parallel with the rendering step, schedules execution of the scripts by the client to validate corresponding data elements no sooner than the step of rendering. The method inputs user data for the document at the client as the step of rendering occurs.

21 Claims, 4 Drawing Sheets

SYSTEM AND METHOD FOR DOWNLOADING A DOCUMENT FROM A SERVER COMPUTER TO A CLIENT COMPUTER

FIELD OF THE INVENTION

This invention relates to documents downloaded in client-server computing systems. It relates particularly to validation and rendering of such documents.

BACKGROUND

FIG. 1A shows a client-server system 10, where a client machine or node 12 has a direct connection via a network link 14 to a server machine 16. FIG. 1B shows an alternate arrangement of a client-server system 10' where a proxy machine 18 forms the connection with the network 14, and offers processing support for the client machine 12, passing data across a local link 20. A proxy is typically used where sophisticated scheduling algorithms are used. The client machine 12 will be running a user agent software application, such as a browser.

A known manner of downloading documents will be described with reference to FIG. 2. A client begins a downloaded process (step 30). Any client-side scripts within the document are downloaded first (step 32). Such scripts can include Javascripts as part of the HEAD node in a HTML document. This continues until the script download is complete (step 34). The document itself is then downloaded to completion (step 36). Validation of the document is then performed (step 38); for example DOCTYPE and DTD-based validation in XML. The document is then rendered to the client (step 40).

This known arrangement is less than satisfactory for users, however, in that there is excessive waiting time, leading to frustration, particularly for thin-clients (eg. mobile devices such as cellular phones and PDAs). There also is poor resource utilization, in that dead scripts can be downloaded and need to be stored in memory.

SUMMARY

The invention provides a system and method for downloading a document from a server computer to a client computer. The system and method repackaged scripts in a document program at the server such that scripts are in a program location no earlier than the program location of a first corresponding data element. The method downloads the repackaged document program to the client. The method renders the repackaged document at the client as it arrives until complete. In parallel with the rendering step, the method schedules execution of the scripts by the client to validate coffesponding data elements no sooner than the step of rendering. The method inputs user data for the document at the client as the step of rendering occurs.

DETAILED DESCRIPTION

Figure 1A:
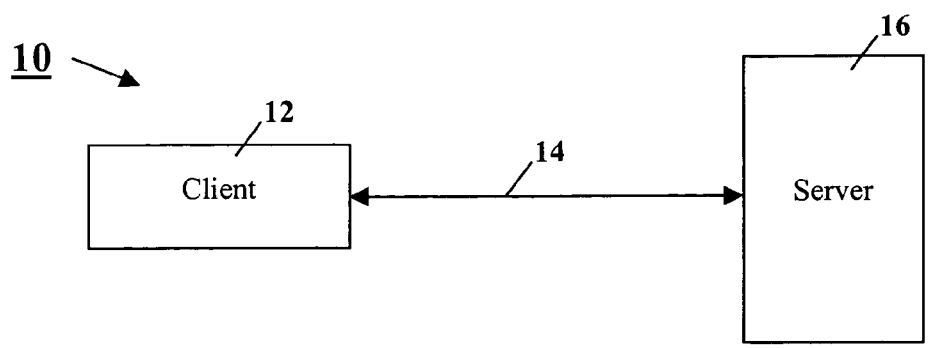
FIGS. 1A and 1B are schematic block diagrams of client-server computer systems.
Figure 1B:
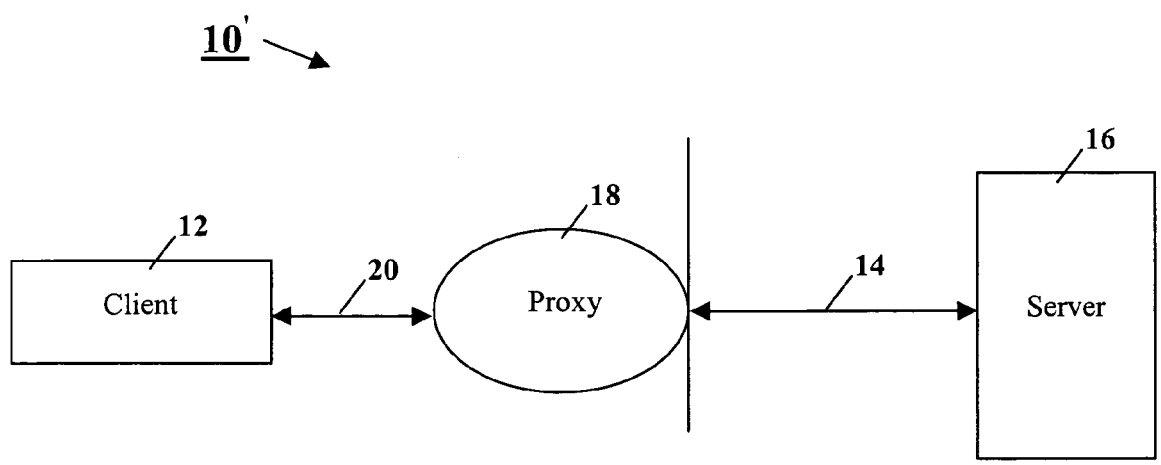
Figure 2:
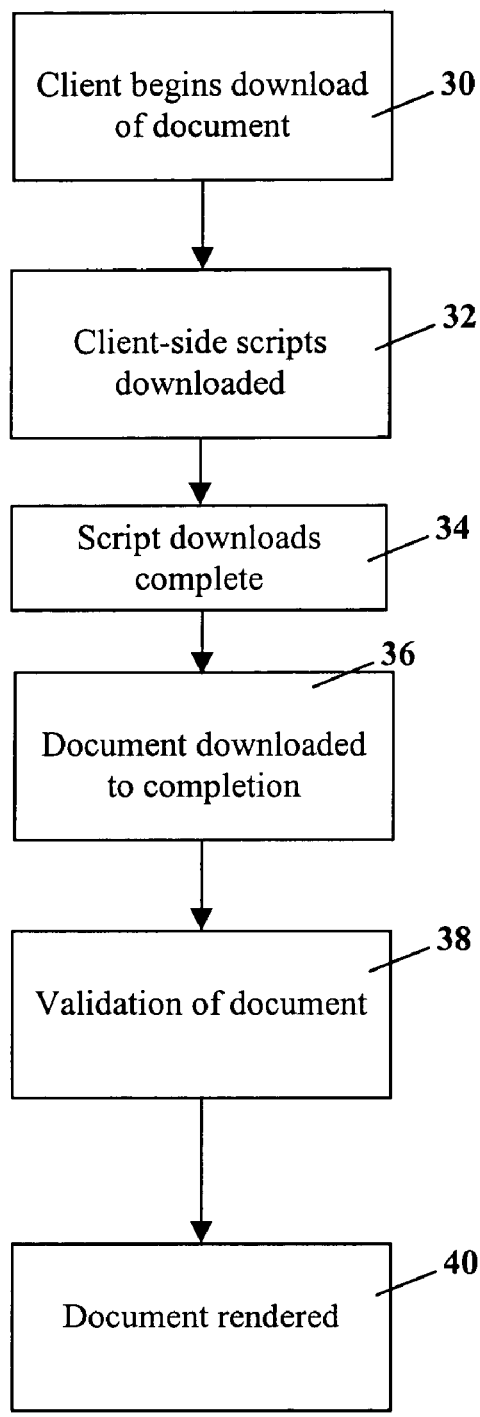
FIG. 2 is a block flow diagram of a known document downloading process.
Figure 3:
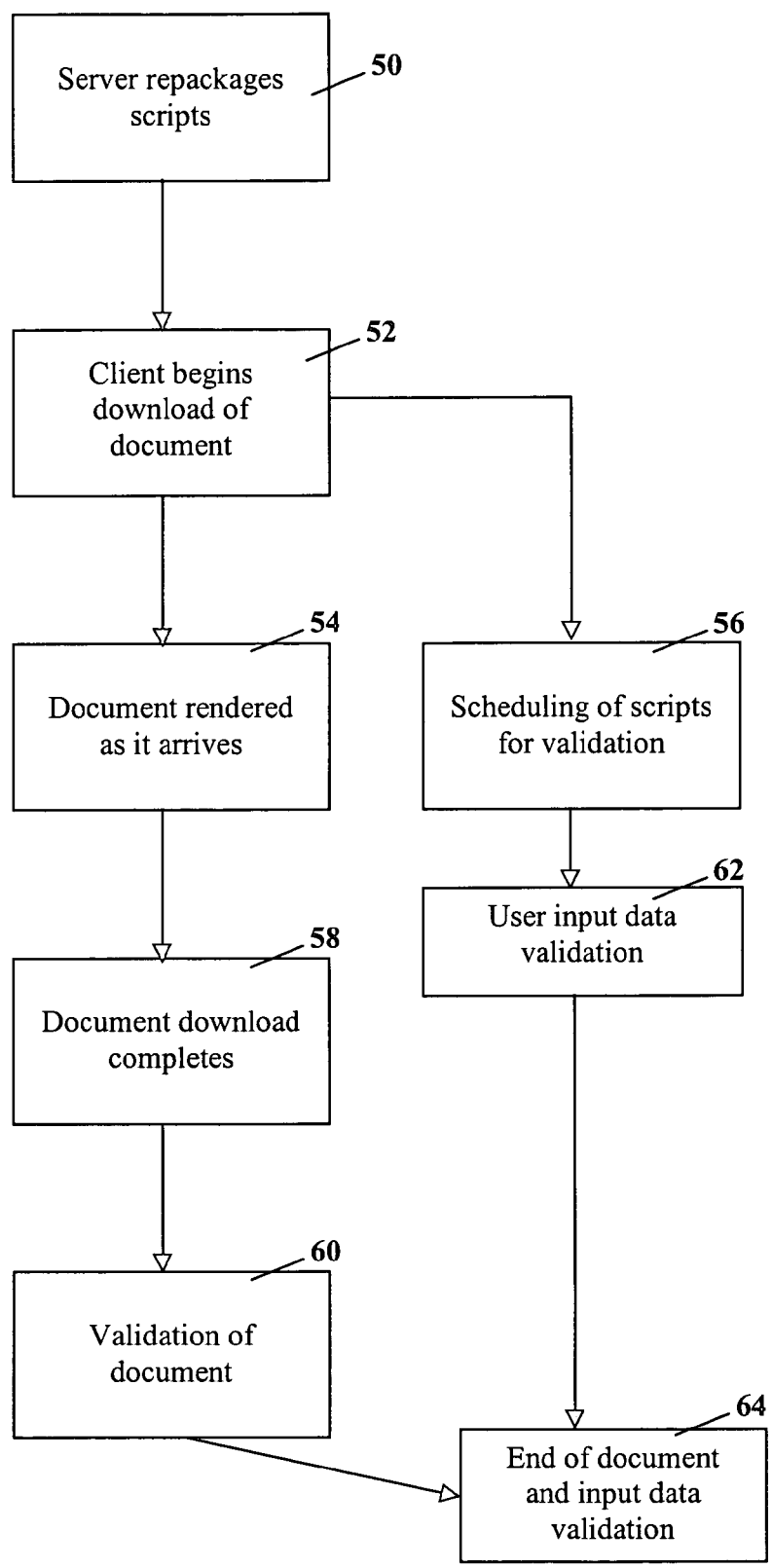
FIG. 3 is a block diagram of a process embodying the invention.

An embodiment of the invention will now be described with reference to FIG. 3. It will be understood that the process described can reside on either form of computer platform 10, 10' shown in FIGS. 1A and 1B. The client machine 12 can take many forms such as personal computers, mobile phones, PDAs, workstations, and so on. The communication protocols that can be supported include HTTP, UDP, HTML, XML, WAP, and Bluetooth.

In response to a client download request, a server repackages any client-side data validation scripts (step 50), for example, to temporarily link a script for validating an element with the element. The client begins downloading the document (step 52). The document is rendered as it arrives at the client (step 54), and the user scripts are scheduled to run contemporaneously with the corresponding element as it is rendered to validate the data (step 56). Client resource restrictions may dictate that a script cannot be held for the lifetime of the application. A script may therefore be scheduled to be downloaded multiple times, particularly if a script is needed for cross-element validation. Only after document download completes (step 58) is validation of the document (eg. the Document Object Model) performed (step 60). A user input data validation (step 62) is also performed were such data exists. This data can include date and numeral inputs. The process ends (step 64) after the document validation and user input data validation conclude.

Repackaging

A number of variables can apply in implementing repackaging algorithms. These include:
(a) client characteristics
(b) data elements that must be validated
(c) data elements that can be validated but could be skipped
(d) data elements whose validation process depends on the validation of other elements (ie. cross-element validation).

An algorithm to achieve repackaging is:
1. Identify the scripts and elements that necessarily must be validated.
2. Separate necessary scripts from remaining (dead) scripts.
3. Identify the relative orders in which scripts will be required for validation at the client side.
4. Place scripts in document according to relative order.
5. Identify the scripts for reach element validation.
6. Embed scripts in element tree unless already existing (i.e. relating to a previous element).

This algorithm is an expression of a "Greedy" repackaging. That is, package all scripts required by the first element whose validation requires them.

Consider the following HTML document:

```
<HTML>
    <HEAD>
        <TITLE>MyFirstPage</TITLE>
        <Script A>
        <Script B>
        <Script C>
        <Script D>
        <Script E>
        <Script F>
    </HEAD>
    <BODY>
        <element 1 ; requires E,B>
        <element 2 ; requires B>
        <element 3 ; requires D, B>
```

```
                -continued
            <element 4 ; requires A, D,
            <element 5 ; requires A>
        </BODY>
    </HTML>
```

A repackaged form of the document—adopting the Greedy algorithm is:

```
    <HTML>
        <HEAD>
            <TITLE>MyFirstPage</TITL
        </HEAD>
        <BODY>
            <element 1 ; script E,B>
            <element 2 ; >
            <element 3 ; script D>
            <element 4 ; script A, C>
            <element 5 ; >
        </BODY>
    </HTML>
```

In other words, the repackaged scripts occur no earlier than the program location of a first corresponding data element.

Scheduling

As already mentioned, a script is scheduled for data validation at the client. Scheduling algorithms can implement the following approaches:

"Greedy": Download each script repackaged and validate as soon as possible (on a per element basis).

"Delayall": Validate all the elements that need a script at a time.

"Cyclic": Validate the $n^{th}$ element value when the $n+1^{th}$ element is being rendered. The last element is validated after it is rendered.

All of these approaches are characterized as being no sooner than the occurrence of rendering.

Rendering

The user agent (e.g. browser) must be configured to display any part of the downloaded document as soon as it is complete enough to be displayed. The browser also is configured to allow the input of user data as soon as a part of the document is displayed.

Document Validation

Document validation is performed in any convenient manner.

Computer Hardware and Software

Figure 4:
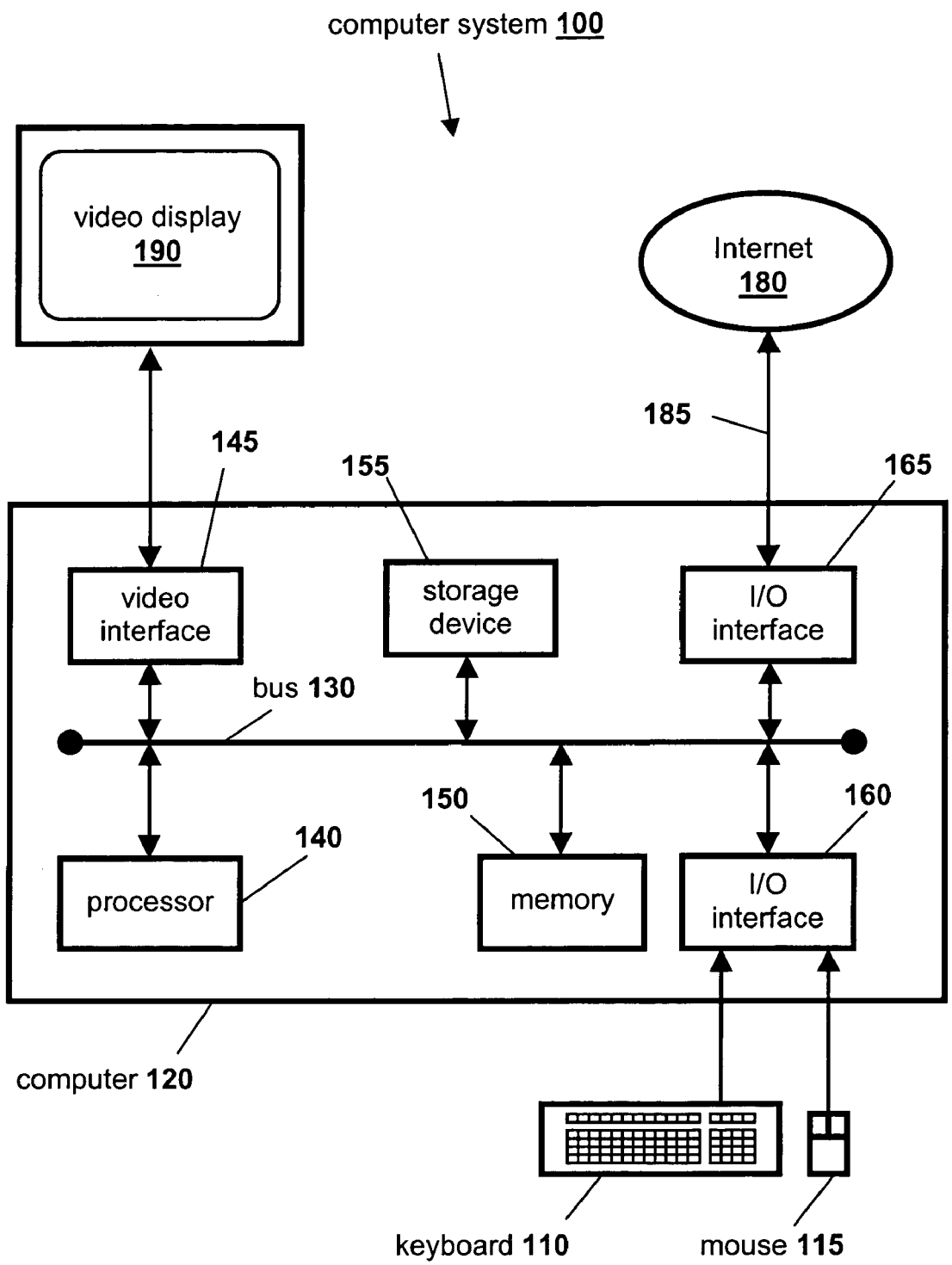
FIG. 4 is a block diagram of a computing platform for a client or server machine upon which the invention can be practised.

FIG. 4 is a schematic representation of a computer system 100 that is provided for executing computer software programmed to perform the techniques described herein. The computer system 100 is suited to fulfil the role of the client or server as described herein above. This computer software executes on the computer system 100 under a suitable operating system installed on the computer system 100. When operating as the server, the computer system 100 performs the repackaging scripts process (step 50 of FIG. 3). When operating as a client, the computer system 100 performs the process functions of steps 52-64 of FIG. 3.

The computer software is based upon computer program comprising a set of programmed instructions that are able to be interpreted by the computer system 100 for instructing the computer system 100 to perform predetermined functions specified by those instructions. The computer program can be an expression recorded in any suitable programming language comprising a set of instructions intended to cause a suitable computer system to perform particular functions, either directly or after conversion to another programming language.

The computer software is programmed using statements in an appropriate computer programming language. The computer program is processed, using a compiler, into computer software that has a binary format suitable for execution by the operating system. The computer software is programmed in a manner that involves various software components, or code means, that perform particular steps in accordance with the techniques described herein.

The components of the computer system 100 include: a computer 120, input devices 110, 115 and video display 190. The computer 120 includes: processor 140, memory module 150, input/output (I/O) interfaces 160, 165, video interface 145, and storage device 155. The computer system 100 can be connected to one or more other similar computers, using a input/output (I/O) interface 165, via a communication channel 185 to a network 180, represented as the Internet.

The processor 140 is a central processing unit (CPU) that executes the operating system and the computer software executing under the operating system. The memory module 150 includes random access memory (RAM) and read-only memory (ROM), and is used under direction of the processor 140.

The video interface 145 is connected to video display 190 and provides video signals for display on the video display 190. User input to operate the computer 120 is provided from input devices 110, 115 consisting of keyboard 110 and mouse 115. The storage device 155 can include a disk drive or any other suitable non-volatile storage medium.

Each of the components of the computer 120 is connected to a bus 130 that includes data, address, and control buses, to allow these components to communicate with each other via the bus 130.

The computer software can be provided as a computer program product recorded on a portable storage medium. In this case, the computer software is accessed by the computer system 100 from the storage device 155. Alternatively, the computer software can be accessed directly from the network 180 by the computer 120. In either case, a user can interact with the computer system 100 using the keyboard 110 and mouse 115 to operate the computer software executing on the computer 120.

The computer system 100 is described only as an example for illustrative purposes. Other configurations or types of computer systems can be equally well used to implement the described techniques.

Conclusion

Various alterations and modifications can be made to the techniques and arrangements described herein, as would be apparent to one skilled in the relevant art.

We claim:

1. A method for downloading a document from a server computer to a client computer, said method comprising the steps of:

repackaging scripts in a document program at the server such that scripts are in a program location no earlier than the program location of a first corresponding data element;

downloading the repackaged document program to said client;

rendering said repackaged document at said client as it arrives until complete;

in parallel with said rendering step, scheduling execution of said scripts by said client to validate corresponding data elements no sooner than said step of rendering; and inputting user data for said document at said client as said step of rendering occurs.

2. The method of claim 1, further comprising validating the rendered document once completely rendered.

3. The method of claim 1, wherein said scheduling step executes a script once all data elements relying on said script have been downloaded from said server.

4. The method of claim 1, further comprising said client validating the input user data.

5. The method of claim 1, wherein said repackaging step packages all scripts required by the first data element whose validation requires those scripts.

6. The method of claim 1, wherein said scheduling step executes a script as it is downloaded from said server.

7. A method for downloading a document from a server computer to a client computer, said method comprising the steps of:

repacking scripts in a document program at the server such that scripts are in a program location no earlier than the program location of a first corresponding data element;

downloading the repackaged document program to said client;

rendering said repackaged document at said client as it arrives until complete; and in parallel with said rendering step, scheduling execution of said scripts by said client to validate corresponding data elements no sooner than said of rendering, wherein said scheduling step executes a script for an $n^{th}$ data element as an $n+1^{th}$ data element is being downloaded.

8. A computer system for downloading a document comprising:

a server computer operable to repackage a document program at the server such that scripts are in a program location no earlier that a first corresponding data element;

a client computer operable to download the repackaged document program, render said document as it arrives until complete, and, in parallel with the rendering, schedule execution of said scripts to validate corresponding data elements no sooner than rendering; and a user data interface to said client computer for data input to said document as rendering occurs.

9. The computer system of claim 8, wherein said client computer schedules execution of scripts once all data elements relying on said script have been downloaded from said server computer.

10. The computer system of claim 8, wherein said client computer validates said rendered document once completely rendered.

11. The computer system of claim 8, wherein said client computer schedules execution of a script as it is downloaded from said server computer.

12. The computer system of claim 8, wherein said client computer validates said input user data.

13. The computer system of claim 8, wherein said server computer repackages all scripts required by the first data element whose validation requires those scripts.

14. A computer system for downloading a document comprising:

a server computer operable to repackage a document program at the server such that scripts are in a program location no earlier that a first corresponding data element; and a client computer operable to download the repackaged document program, render said document as it arrives until complete, and, in parallel with the rendering, schedule execution of said scripts to validate corresponding data elements no sooner than rendering, wherein said client computer schedules execution of a script for an $n^{th}$ data element as an $n+1^{th}$ data element is being downloaded from said server computer.

15. A client computer for downloading from a server computer a repackaged document having scripts that are in program location no earlier than the location of a first corresponding data element, said client computer being operable to render said document ad it arrives until complete, and, in parallel with the rendering, schedule execution of said scripts to validate corresponding data elements no sooner than rendering, and a user data interface for data input to said document as rendering occurs.

16. The computer system of claim 15, wherein said rendered document is validated once completely rendered.

17. The client computer of claim 15, wherein said input user data is validated.

18. The client computer of claim 15, wherein execution of a script is scheduled as it is downloaded from said server computer.

19. The client computer of claim 15, wherein execution of a script is scheduled once all data elements relying in said script have been downloaded from said server computer.

20. A client computer for downloading from a server computer a repackaged document having scripts that are in a program location no earlier than the location of a first corresponding data element, said client computer being operable to render said document as it arrives until complete, and, in parallel with the rendering, schedule execution of said scripts to validate corresponding data elements no sooner than rendering, wherein execution of a script is scheduled for an $n^{th}$ data element as an $n+1^{th}$ data element is being downloaded from said server computer.

21. A computer program product comprising a computer program recorded on a storage medium, said program comprising:

computer program element means for repackaging a document program at a server computer such that scripts are in a programs location no earlier than a location of a first corresponding data element;

computer program element means for downloading the repackaged document program to a client computer;

computer program element means for rendering said document at said client computer as it arrives until complete;

computer program element means for, in parallel with execution of said by said client computer to validate corresponding data elements no sooner than rendering, and computer programs element means for inputting user data for said document at said client as said step of rendering occurs.

* * * * *